(12) United States Patent
El-Zahab et al.

(10) Patent No.: US 9,947,431 B2
(45) Date of Patent: Apr. 17, 2018

(54) ANISOTROPIC FILMS TEMPLATED USING ULTRASONIC FOCUSING

(71) Applicants: Bilal El-Zahab, Miami Beach, FL (US); Kamran Moradi, Miami, FL (US)

(72) Inventors: Bilal El-Zahab, Miami Beach, FL (US); Kamran Moradi, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 14/692,255

(22) Filed: Apr. 21, 2015

(65) Prior Publication Data

US 2016/0314868 A1    Oct. 27, 2016

(51) Int. Cl.
| | |
|---|---|
| *H01B 1/22* | (2006.01) |
| *B01J 19/10* | (2006.01) |
| *B01J 19/12* | (2006.01) |
| *G02B 5/30* | (2006.01) |
| *H01B 1/24* | (2006.01) |
| *H01B 1/20* | (2006.01) |

(52) U.S. Cl.
CPC ............. *H01B 1/22* (2013.01); *G02B 5/3058* (2013.01); *G02B 5/3083* (2013.01); *B01J 19/10* (2013.01); *B01J 19/12* (2013.01); *B01J 2219/089* (2013.01); *B01J 2219/12* (2013.01); *H01B 1/20* (2013.01); *H01B 1/24* (2013.01)

(58) Field of Classification Search
None
See application file for complete search history.

(56) References Cited

U.S. PATENT DOCUMENTS

| | | | | | |
|---|---|---|---|---|---|
| 5,413,659 | A | * | 5/1995 | Koskenmaki | H01B 1/22 156/229 |
| 2008/0152926 | A1 | * | 6/2008 | Baikerikar | C08L 33/14 428/422.8 |
| 2008/0265414 | A1 | * | 10/2008 | Ho | H01B 1/22 257/741 |
| 2010/0019209 | A1 | * | 1/2010 | Meng | B82Y 30/00 252/511 |
| 2010/0047514 | A1 | * | 2/2010 | Hung | H02N 11/006 428/114 |
| 2014/0072778 | A1 | * | 3/2014 | Feng | H01B 1/24 428/195.1 |
| 2014/0202738 | A1 | * | 7/2014 | Allemand | C09D 5/24 174/251 |
| 2015/0050450 | A1 | * | 2/2015 | Beraud | B29C 70/882 428/113 |

FOREIGN PATENT DOCUMENTS

JP          06242423 A  *  9/1994

OTHER PUBLICATIONS

Mao et al. Tailored Parallel Graphene Stripes in Plastic Film with Conductive Anisotropy by Shear-Induced Self-Assembly. Journal of Physical Chemistry Letters, 2013, 4, 43-47 (Year: 2013).*
Huang et al. Parallel Carbon Nanotube Stripes in Polymer Thin Film with Remarkable Conductive Anisotropy. ACS Applied Materials and Interfaces, 2014, 6, 1754-1758 (Year: 2014).*
Yun et al. Electrically Anisotropic Thin Films Consisting of Polymeric and Metallic Nanolayers from Self-Assembled Lamellae of Diblock Polymers. Langmuir, 2005, 21, 3625-3628 (Year: 2005).*
Barnkob, R. et al., "Measuring the local pressure amplitude in microchannel acoustophoresis," *Lab Chip*, 2010, pp. 563-570, vol. 10.
Lenshof, A. et al., "Acoustofluidics 5: Building microfluidic acoustic resonators," *Lab Chip*, 2012, pp. 684-695, vol. 12.
Nilsson, A. et al., "Acoustic control of suspended particles in micro fluidic chips," *Lab Chip*, 2004, pp. 131-135, vol. 4.
Parichehreh, V. et al., "Inertial lift enhanced phase partitioning for continuous microfluidic surface energy based sorting of particles," *Lap Chip*, 2012, pp. 1296-1301, vol. 12.

\* cited by examiner

*Primary Examiner* — Tanisha Diggs
(74) *Attorney, Agent, or Firm* — Saliwanchik, Lloyd & Eisenschenk

(57) ABSTRACT

An anisotropic composite film includes a plurality of effectively parallel lines of particles with a polymeric or other solid matrix. The composite films are prepared by dispersion of the particles within a precursor to the matrix, such as a monomer, and acoustically stimulating the dispersion to form effectively parallel lines of the particles that are fixed by polymerizing the monomer or otherwise solidifying a matrix. The composite film is anisotropic and the transmittance of the composite film can exceed 50%. The composite films can be rigid or flexible. The composite film can be electrically conductive. The composite films can be employed as transparent electrodes for, displays, solar cells, and wearable devices.

17 Claims, 5 Drawing Sheets

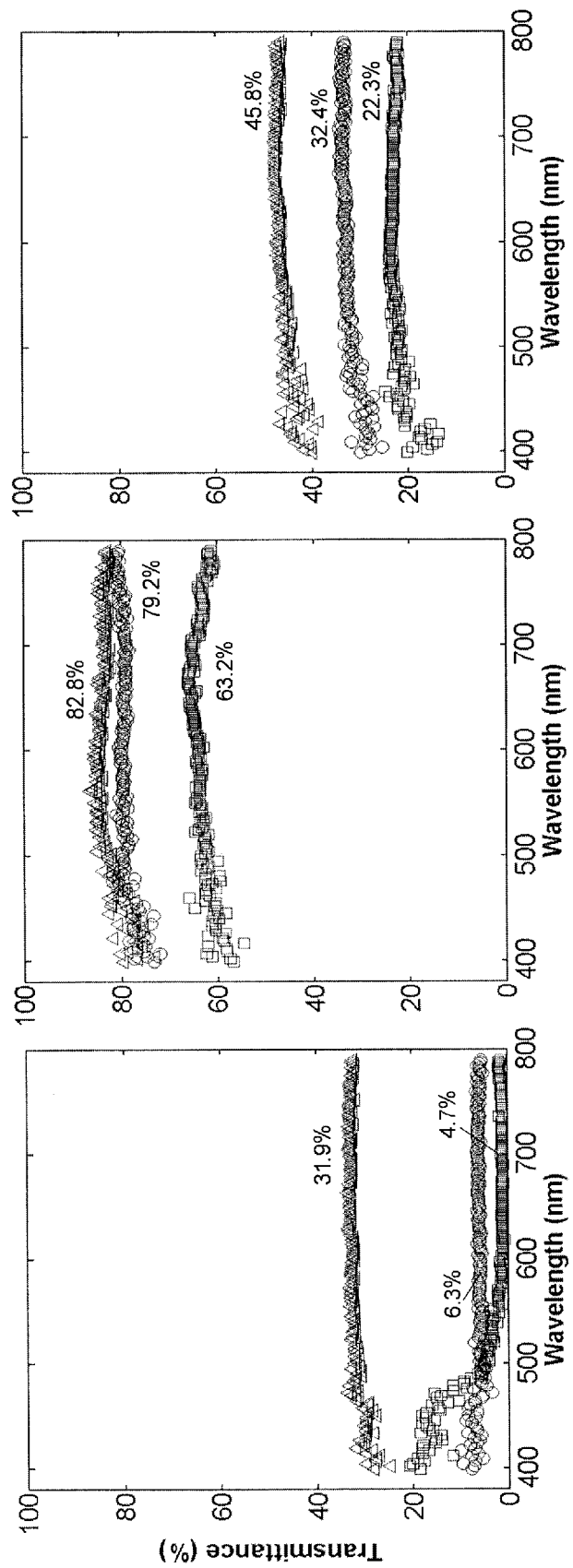

ANISOTROPIC FILMS TEMPLATED USING ULTRASONIC FOCUSING

GOVERNMENT SUPPORT

This invention was made with government support under grant number EEC-1160483 awarded by the National Science Foundation. The government has certain rights in the invention.

BACKGROUND

Advances in flexible organic electronics enabled development in research areas such as light emitting diodes (LED), transistors, solar cells, and wearable devices. These organic electronics distinguish themselves from their inorganic counterparts by possessing advantages including higher mechanical flexibility, lower gravimetric density, and comparatively lower cost, which are all key factors to the production of conductive electrodes in optoelectronic devices.

Presently, although the active layers and other layers, such as charge carrier transport and blocking layers, can be formed as flexible layers, the required transparent electrode layers are not typically flexible, generally being formed from conducting oxides, such as indium tin oxide (ITO) and fluorine tin oxide (FIO). These materials have shortcomings, in addition to their inherent lack of flexibility, including the limited worldwide resources of indium, acid/base instability, and limited transparency in the near-IR region. Therefore, alternate materials that are highly stable, transparent, and flexible, yet of sufficient electrical conductivity are highly desired. Relatively few conductive oxide replacements have been developed, primarily due to the lack of transparency. Thin potentially flexible, electrically conductive layers with optical transparencies exceeding 70% are rare; for example, 86% transmission has been achieved using carbon nanotubes, Lenshof, et al., *Lab Chip* 2012, 12, 684, and sheet resistance of 471 Ω/square, Parichehreh et al., *Lab Chip* 2012 7, 1296. There remains a need to prepare optoelectronic devices with conductive electrodes that are flexible, cheap, and compatible with large-scale manufacturing methods.

As in the case with carbon nanotube, manipulating of particles in suspension is required. Manipulation of particles by applying external stimuli has attracted attention in different fields, especially in lab-on-a-chip applications. Means of manipulating electronic materials include electrokinetic, inertial, magnetophoretic, optical, and dielectrophoretic (DEP). Alternatively, acoustic stimulation allows rapid, gentle, and label-free particle manipulation based on particles' physical properties such as size, density, and compressibility. Advantages of acoustophoresis have been seen recognized in the biotechnology field for cell trapping, cell sorting, and plasmaphoresis. However, acoustic methods are currently limited to flow systems and have not been used to template organic electronic materials. Nevertheless, to this end, an acoustic method of forming an anisotropic film is desirable.

BRIEF SUMMARY

Embodiments of the invention are directed to anisotropic composite films and methods of making these films. In embodiments of the invention, the films include a cross-linked polymer and are effectively transparent. In embodiments of the invention, films are used as electrodes for flexible electronics, displays, solar cells, and wearable devices. In embodiments of the invention, the anisotropic films comprise spatially arranged particles where the particles provide utility in a wide variety of uses. The various types of anisotropic composite films include, but are not limited to, films that are valuable for: electronic conductivity, where the particles can be selected from, but are not limited to, silver, copper, aluminum, iron, nickel, or carbon; gas sensing where the particles can be selected from, but are not limited to, titanium dioxide, zinc oxide, zirconia, platinum, palladium, silicon, gallium arsenide, indium phosphide, silicon carbide, or gallium nitride; light sensing, where the particles can be selected from, but are not limited to, silicon, germanium, indium gallium arsenide, lead(II) sulfide, mercury cadmium, telluride, cadmium sulfide, and quantum dot materials: energy harvesting, where the particles can be selected from, but are not limited to, silicon, titanium dioxide, cadmium telluride, $Cu(In,Ga)Se_2$, quantum dots, and carbon nanomaterials; electroluminescent, where the particles can be selected from, but are not limited to, zinc sulfide, carbon nanomaterials, gallium arsenide, indium phosphide, gallium nitride, ruthenium 2-2'-bipyridine salts, and organic dyes; energy storage, where the particles can be selected from, but are not limited to, copper, aluminum, nickel, lithium, lithium cobalt oxide, lithium iron phosphate, lithium nickel manganese oxide, graphite, and carbon nanomaterials; and thermal heatsinks, where the particles can be selected from, but are not limited to, silver, copper, aluminum, graphene, carbon nanotubes, carbon nanoparticles and microparticles.

In an embodiment of the invention, a method of controlling the spatial arrangement of metal particles in a medium comprises suspending the particles in the medium and applying acoustic waves to the medium. In embodiments of the invention, the acoustic waves are standing waves. The spatial arrangement provided herein renders the film anisotropic, with a plurality of effectively parallel lines of metal nanoparticles in the medium. In embodiments of the invention, the medium is transformed into a polymeric film. By having very thin parallel lines of particles, according to an embodiment of the invention, the placement and alignment of the particles in a transparent medium forms an anisotropic composite film that can be fixed to retain the special alignment imposed by the acoustic waves.

In an embodiment of the invention, a method of fabricating an electronically conductive film comprises: suspending conductive metal particles in a fluid comprising a monomer; applying standing acoustic waves to the suspension; and curing the monomer to form a polymer film. In an embodiment of the invention, the fluid comprises a polymerization initiator and the film is cured by applying an external energy source following the application of the acoustic waves. In an exemplary embodiment, the external energy source is ultraviolet (UV) light. In this manner, an electronically conductive film comprising a polymer matrix filled with conductive metal particles, which are spatially arranged as effectively parallel lines by acoustic alignment, is formed.

The controlled spatial arrangement of conductive particles renders the conductivity of the film anisotropic. In an embodiment of the invention, the cured polymer film is transparent. The shape, size, and amount of the conductive particles suspended in the monomer comprising fluid render the resultant films anisotropic, flexible, and transparent.

By acoustically aligning the particles in the monomer solution and subsequently curing the solution, continuous electron conduction pathways are constructed within the films in a directional manner, while enabling the films to be effectively transparent.

BRIEF DESCRIPTION OF THE DRAWINGS

FIG. 2A shows 10% by weight particles suspended in the fluid and dispersed without alignment; FIG. 2B shows 10% particles in suspension after acoustic alignment at 2 MHz and 16 Vpp; FIG. 2C shows 2% particles in suspension, fully dispersed without alignment; and FIG. 2D shows 2% particles in suspension after acoustic alignment at 2 MHz and 16 Vpp.

FIG. 5A through 5C are plots of transmittance over the visible spectrum for electronically conductive films where triangular symbols are data points for an electrically conductive film comprising 2% particles, circular symbols for 5% particles, and square symbols for 10% particles; where FIG. 5A is for particles with no acoustic stimulation applied, FIG. 5B is for acoustically aligned particles stimulated by 150 kHz acoustic waves, according to an embodiment of the invention, and FIG. 5C is for acoustically aligned particles stimulated by 2 MHz according to an embodiment of the invention.

DETAILED DESCRIPTION

Figure 1:
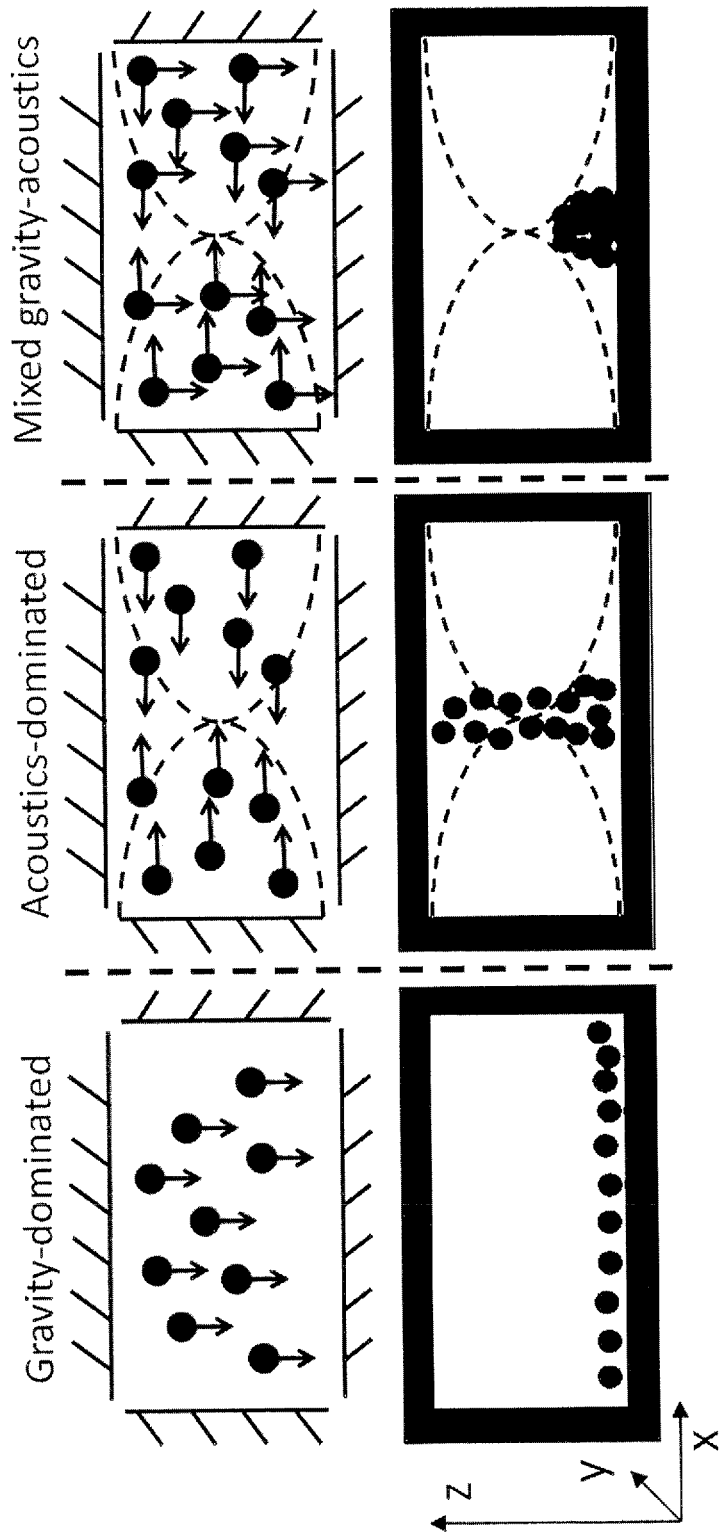
FIG. 1 is a schematic of the steady-state particles' assembly in a half wavelength resonator compartments for, from left to right: a gravity-dominated mode, an acoustics-dominated mode, and a mixed gravity-acoustics mode.
Figure 2B:
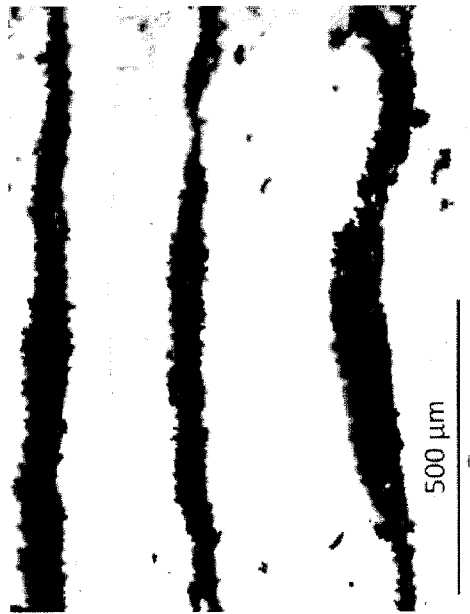
FIGS. 2A through 2D display optical micrographs taken in transmission mode, where.
Figure 2D:
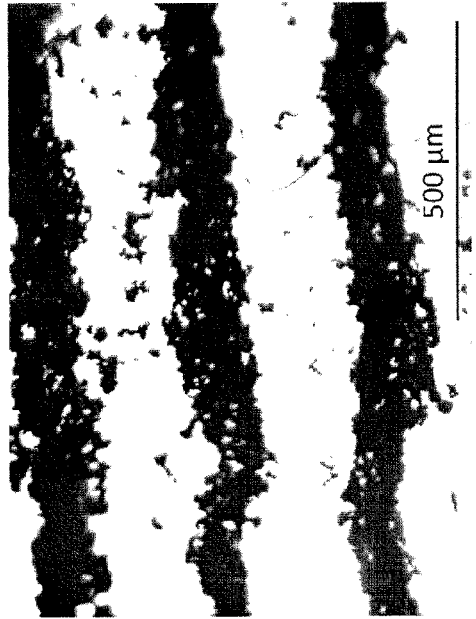
Figure 2A:
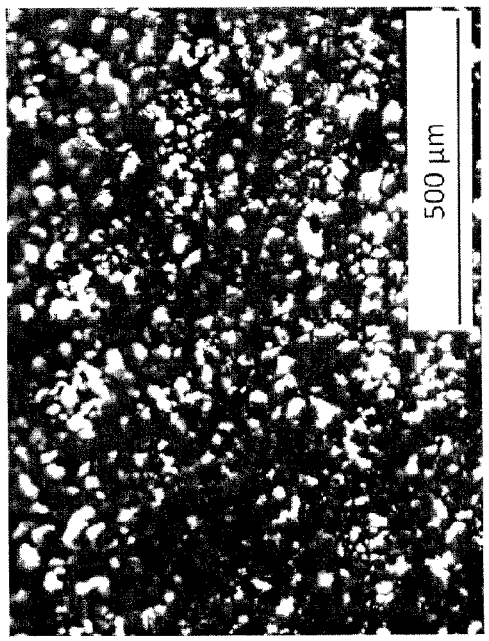
Figure 2C:
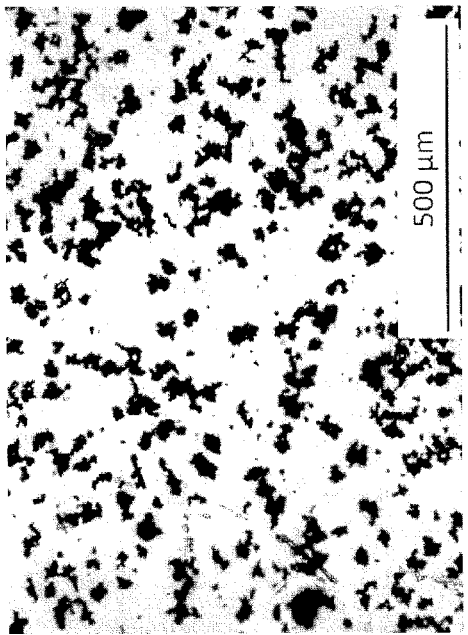

Embodiments of the invention are directed to anisotropic composite films and an acoustic method for preparing the transparent anisotropic electronically conductive composite films. In other embodiments of the invention, these transparent anisotropic composite films are electrodes for electronics, displays, solar cells, wearable devices, and any other device that requires a transparent electrode. The composite films can be rigid or flexible, depending on the polymer employed as the matrix of the composite. In embodiments of the invention, the anisotropic composite film can have a high degree of transparency.

The anisotropic composite films include, but are not limited to, films that are valuable for: electronic conductivity, where the particles can be selected from, but are not limited to, silver, copper, aluminum, iron, nickel, or carbon; gas sensing where the particles can be selected from, but are not limited to, titanium dioxide, zinc oxide, zirconia, platinum, palladium, silicon, gallium arsenide, indium phosphide, silicon carbide, or gallium nitride; light sensing, where the particles can be selected from, but are not limited to, silicon, germanium, indium gallium arsenide, lead(II) sulfide, mercury cadmium, telluride, cadmium sulfide, and quantum dot materials; energy harvesting, where the particles can be selected from, but are not limited to, silicon, titanium dioxide, cadmium telluride, Cu(In,Ga)Se$_2$, quantum dots, and carbon nanomaterials; electroluminescent, where the particles can be selected from, but are not limited to, zinc sulfide, carbon nanomaterials, gallium arsenide, indium phosphide, gallium nitride, ruthenium 2-2'-bipyridine salts, and organic dyes; energy storage, where the particles can be selected from, but are not limited to, copper, aluminum, nickel, lithium, lithium cobalt oxide, lithium iron phosphate, lithium nickel manganese oxide, graphite, and carbon nanomaterials; and thermal heatsinks, where the particles can be selected from, but are not limited to, silver, copper, aluminum, graphene, carbon nanotubes, carbon nanoparticles and microparticles. The particles can be spheres, quasi-spheres, fibers, rods, wires, platelets, or any other geometry or combination of geometries.

Although an embodiment of the invention is described with respect to an anisotropic electrically conductive composite film, one of ordinary skill in the art can appreciate that non-electrically conductive particles can be substituted to prepare films for applications that do not require electrical conductivity. In an embodiment of the invention, the spatial arrangement of metal particles in the film is achieved by suspending the particles in a fluid medium, applying acoustic waves to the medium, and rendering the medium non-fluid to fix the orientation of the particles within the film. In embodiments of the invention, acoustic waves are standing waves. Standing waves can be generated by two acoustic waves projected in opposite directions. The waves can be produced using a transducer and a reflector or by two transducers in a compartment that is made of good acoustic conducting materials. The particles' response to the standing wave is affected by their spatial coordinates, size, compressibility, and density. Nilsson et al., *Lab Chip* 2004, 4, 131 and Barnkob et al., *Lab Chip* 2010, 10, 563 teach alignment of particles by acoustic waves, and are incorporated herein by reference.

In its simplest configuration, acoustic radiation causes a particle to migrate at a force given by Equation (1), $$F_{ax} = -[\pi P_0^2 V_p \beta_f / 2\lambda] \varphi(\beta \rho) \sin(2kx) \tag{1}$$

where $F_{ax}$ is the acoustic radiation force, $P_0$ is pressure amplitude, and $V_p$ is the volume of the particles. The direction of particle migration is either towards the closest node or anti-node of the standing wave depending upon the sign of the acoustic contrast factor given by Equation (2), $$\varphi = (5\rho_p - 2\rho_f)/(2\rho_p + \rho_f) - \beta_p/\beta_f \tag{2}$$

where $\varphi$, the acoustic contrast factor, is a function of the physical properties of the medium, $\rho_p$ and $\rho_f$ are bulk densities of the particles and medium, respectively, and $\beta_p$ and $\beta_f$ are acoustic compressibilities of the particles and medium, respectively. The term k designates the wave number, and $\lambda$ is the wavelength.

Most suspensions of solid particles have a positive acoustic contrast factor, indicating that the direction of migration under acoustic influence is focused toward the nodes. The number of alignments formed in the medium is controlled by the number of nodes characteristic to a given standing wave. Therefore, the resultant morphology of the particles' alignment within the medium is determined by the frequency and amplitude of the standing wave. In an exemplary embodiment of the invention, the medium is a monomer solution with suspension of conductive particles.

In embodiments of the invention, metal particles that are suspended in the medium are subject to gravitational, buoyant, drag, and acoustic forces. These forces and their magnitudes differ depending upon factors including, but not limited to, the viscosity of the medium, the amount of the particles in the suspension, and the frequency and amplitude of the applied acoustic waves. The viscosity of the medium can be adjusted by adding a solvent, which reduces the drag of particles that resist acoustic alignment. Gravitational force dominates over buoyancy due to the larger density differences between the metal particles and the organic medium. The particles' spatial arrangement is controlled by the interplay between the gravitational force and the acoustic force, as illustrated schematically in FIG. 1. Under the influence of gravity and acoustic condition, the particles arrange as effectively parallel lines along a single axis rather than displaying random orientation along the perpendicular axis. The parallel lines are not perfectly straight or of absolutely uniform density; therefore, the term effectively parallel is used herein to indicate this non-perfect linear orientation.

In embodiments of the invention, the method of preparing the transparent electronically conductive composite films occurs in a compartment that can effectively propagate the acoustic waves for focusing the particles at the nodes of the waves. The material is one that permits good sound conduction, has an advantageous geometry, and has smooth walls. In an embodiment of the invention, glass is employed as the container material, where the two walls of the container are parallel, such that one wall is a resonator and the other wall is a reflector. The glass walls are smooth. The spacing of the particles along the single axis is controlled by the frequency of the acoustic stimulus. As per Equation 2, a positive contrast factor indicates a nodal focusing. Dense continuous lines of particles with resistance less than 1Ω can be formed in a fluid medium, such as a monomer. The aligning of the particles can be carried out in the monomer and fixed upon polymerization.

The metal particles can be nanoparticles or microparticles, or a combination thereof. The metal particles can be any pure metal, metal alloy, or can be a composite particle comprising a metal surface, for example, a core-shell particle that has a metal shell, and a core that is metallic or non-metallic, for example, a metal, a glass, a ceramic, or a polymer core with a shell of a metal, for example, a conductive metal. The conductive metal can be a noble metal, such as silver, gold, platinum, or other metal. The metal can be resistant to oxidation in air. The particles can be from about 10 nm to about 10 μm in cross-section. The particles can be spherical, cubic, platelet, rod shaped or any other geometry. In other embodiments of the invention, the conductive particles are irregular, quasi-spherical with cross-sections ranging from about 0.1 to about 100 μm. Exemplary metal particles include nickel, molybdenum, titanium, gold, silver, platinum, copper, tin, zinc, tungsten, combinations thereof, or alloys thereof. An exemplary embodiment provides that the conductive particles are silver-plated nickel particles.

The monomer can be of any step-growth or chain-growth polymer that can polymerize without formation of a non-volatile product. Polymers formed by a chain-growth process at a relatively rapid rate at ambient temperatures are useful. The monomers can be polymerized to a thermoplastic, an elastomer, or a highly reticulated resin depending upon the average functionality of the monomer or monomer mixture. Depending upon the application for the transparent conductive composite film, the type of polymerization, the type of monomer or monomers employed and the mode of initiation can vary. The polymerization mixture can include a polymer and/or a solvent to control the viscosity of the medium in which the metal particles are aligned. The polymerization can be a photopolymerization of a vinyl monomer, for example, an acrylate comprising monomer, a methacrylate comprising monomer, a conjugated diene comprising monomer, or other vinyl comprising monomers. The polymer can be a thermoplastic, a thermoset, and can be a rubber of a high $T_g$ or $T_m$ material. Alternatively, the medium in which the particles can be aligned anisotropically can be any material that can be fixed after alignment. For example, a material can be liquefied prior to inclusion of the particles and subsequently solidified after alignment of the particles. For example, a material can be melted, particles can be included and aligned, and then crystalized or frozen as a glass to achieve the anisotropic composite film.

In an exemplary embodiment of the invention, the matrix of the composite film is from the polymerization of trimethylolpropane ethoxylate triacrylate (TMEP-ETA), which is polymerized by UV irradiation of the photoinitiator 2-hydroxy-2-methylpropiophenone (HMPP). The irradiation is carried out during or immediately after the acoustic stimulation to form lines of silver coated nickel particles. The monomer metal particle suspension is placed in a three-dimensional compartment congruent with the shape of the film, the compartment being an acoustically conducting material. In an exemplary embodiment, the compartment comprises a borosilicate glass, whose optical transparency also allows in-situ visual monitoring of the particle alignment process.

Effective particle alignment is achieved when the applied acoustic force is transferred to the bulk of the metal particle in monomer suspension with minimal loss. Effective acoustic alignment is achieved with propagation in the presence of an effective acoustic conductor, a favorable geometry of the compartment, and smooth surfaces of the compartment. The loss of energy due to attenuation can lead to inefficient alignment of particles such that the particles are in physical contact with each other, causing discontinuity in the electrical contact and subsequently rendering the film non-conductive. The second factor, the geometry of the compartment, influences the viability of the acoustic focusing as well as the macroscopic properties of the resulting particle alignment. In order for the standing wave formation to be possible, the two side walls of the compartment, one functioning as a resonator and the other as a reflector, have to be as parallel as physically possible. Additionally, the surfaces of these walls also need to be as smooth as possible in order to minimize acoustic scattering and absorption, leading to more efficient reflection of acoustic radiation.

The effective nodal focusing and particle alignment on the morphology of the films which are optical micrographs in transmission mode, is shown in FIG. 2 for composite films prepared using about 2% metal particles (FIGS. 2C and 2D) and about 10% metal particles (FIGS. 2A and 2B) by weight, with respect to the monomer solution that formed the matrix. At 2 MHz acoustic stimulation, effectively parallel lines formed by the particles are dense and continuous, as shown in FIGS. 2B and 2D, as opposed to unaligned films which display dispersed particles, as shown in FIGS. 2A and 2C.

The controlled spatial arrangement of conductive particles renders the conductivity of the film anisotropic. Exemplary data in Table 1, below, illustrate that the resistance of the acoustically aligned films can be less than 10Ω in the direction of the alignment, while exceeding 1 MΩ in the direction perpendicular to the alignment. Film prepared using unaligned suspensions are poorly conductive with resistance in the MΩ range along any axis. The particle loading of the composite film can range from about 0.5% to about 10% by weight with respect to the polymer in the film.

Figure 4:
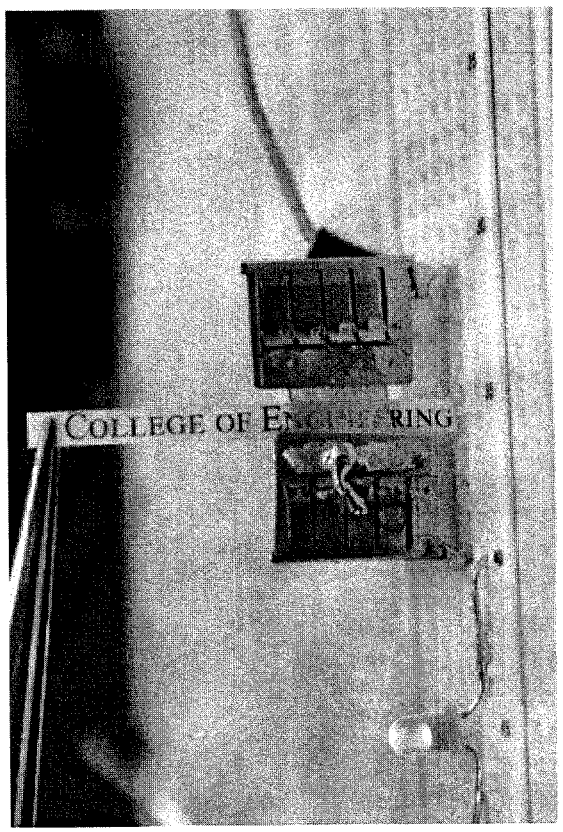
FIG. 4 is a photograph of a circuit (left) with an electronically conductive film (right) in series with a CR2032 3V lithium-ion battery and a red light emitting diode.
Figure 4:
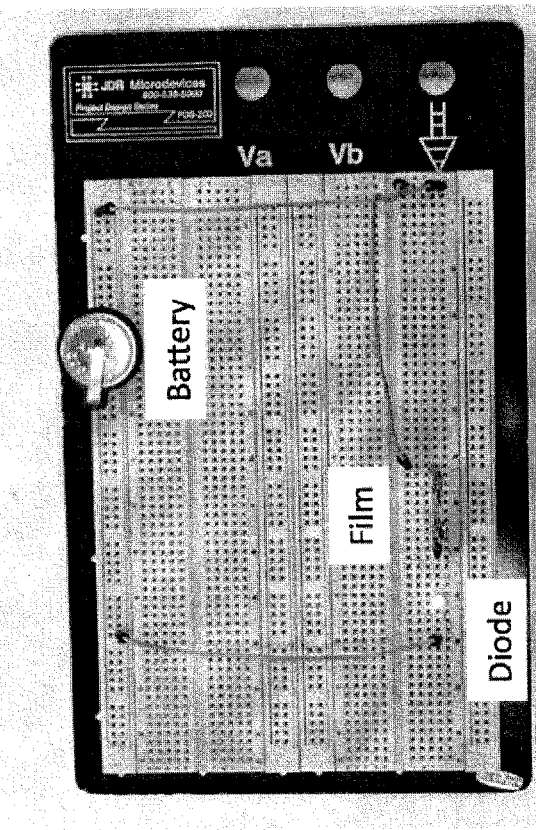

In embodiments of the invention, an anisotropic electrically conductive composite film is effectively transparent to the naked eye. Transmittance in excess of 50% is readily achieved. As shown in FIG. 4, UV-cured TMEP-ETA is effectively transparent to the naked eye in the visible light range of 400 to 800 nm. The transparent conductive composite films can be transmissive to infrared, near infrared, visible, near ultraviolet, and ultraviolet, depending upon the choice of the matrix material of the composite. In embodiments of the invention, the transparency can vary significantly for the same loading of metal particles. The frequency and power of the acoustic stimulation can result in various transparencies for the same particles at the same loading and an optimal loading of particles is a balance of transparency and conductivity.

The transparent conductive composite films can be used as electrodes in a number of applications including, but not limited to, displays, solar cells, and wearable devices. In contrast to conventional technologies such as photolithography, the method for preparing the transparent conductive composite films is rapid and requires little specialized instrumentations. The transparent conductive composite films, according to embodiments of the invention, are of low cost, readily fabricated, and allow the preparation of flexible devices.

Materials and Methods

Silver-coated nickel quasi-spherical particles with average diameter of 6 µm were obtained from Sigma-Aldrich (St. Louis, Mo.). The resin used for the preparation of the films was prepared by combination of trimethylolpropane ethoxylate triacrylate (TMEP-ETA) and the photo-initiator 2-hydroxy-2-methylpropiophenone (HMPP), which were obtained from Sigma-Aldrich. A compartment for acoustic focusing was constructed from glass with the dimensions 10×10×1 mm. A piezoceramic actuator PZ26 (FerroPerm, Denmark) was affixed on one of the sides parallel to the shallow coordinate, i.e. Z-axis.

Fabrication of Films Using Acoustic Focusing

Monomer solution was prepared by dissolving HMPP in TMEP-ETA at a 1:100 weight ratio under gentle stirring conditions. In some studies, acetone was added up to 3:1 volume ratio with respect to the monomer solution as a means to reduce the viscosity of the suspension. To the monomer solution, an appropriate amount of conductive particles was added. The particles were suspended by rigorous mixing for 5 minutes followed by sonication for 10 minutes. Due to their high density, and depending upon the viscosity of the monomer solutions, the particles rapidly began to precipitate in the compartment prior to applying acoustic alignment.

The alignment was initiated by switching on the frequency generator and selecting the desired amplitude (1-25 Vpp) and frequency (100 kHz-2 MHz). The particles' response was typically instantaneous, taking only a few seconds to reach steady state. After steady state was reached, the film was cured by UV illumination from the top of the film, using a low-power (6 W) 365-nm handheld UV lamp for 2 minutes. After curing, the film was recovered from the compartment by removing the side caps and sliding it out. The films that contained acetone were left on a petri dish to allow the solvent to evaporate. The films were then stored in a dry and inert environment until tested for optical transparency and electrical conductivity.

Evaluation of Electronic Properties of Films

The surface electrical resistance of the films was measured using a Hewlett Packard 34401A multimeter using two gold electrodes with adjustable spacing. The maximum resolution of the multimeter was 100 mΩ. The bulk conductivity of the films was calculated using Equation (3):

$$\Sigma = L/ZA \quad (3)$$

where $\Sigma$ is the bulk electronic conductivity in S·cm$^{-1}$, L is the spacing between the electrodes in cm, A is the cross-sectional area of the film in cm$^2$, and Z is the electrical resistance of the film in ohms.

Figure 3:
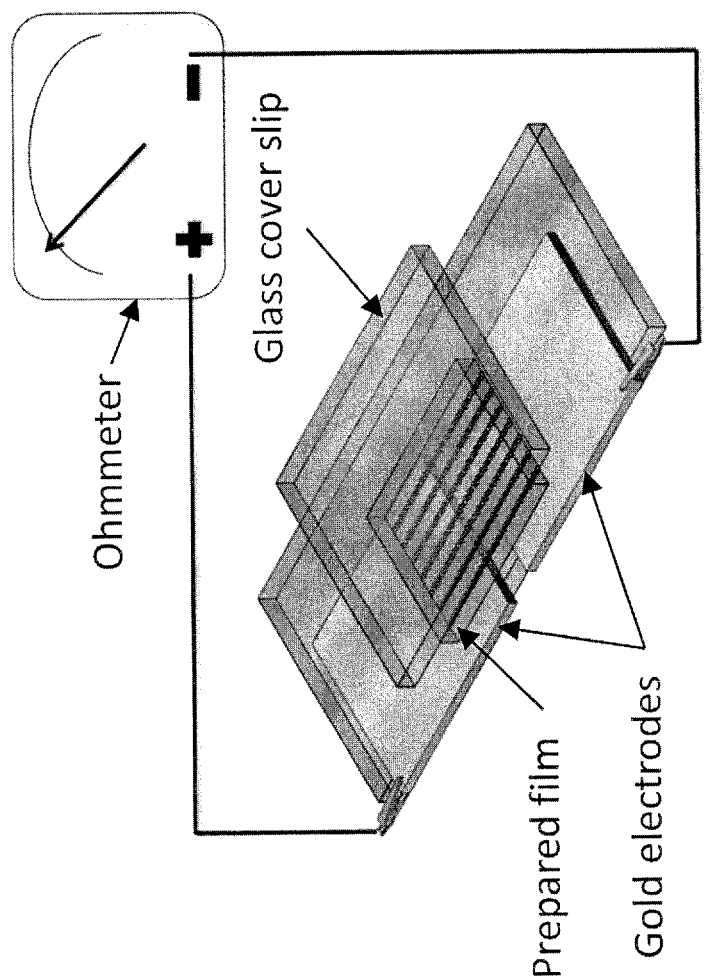
FIG. 3 is a drawing of the setup used for testing the surface resistivity of the electronically conductive film according to an embodiment of the invention, where two gold electrode plates with adjustable spacing were connected to an ohmmeter.

As shown in Table 1, following acoustic alignment at 2 MHz, films displayed little resistance, less than 10Ω, when measured using the apparatus shown in FIG. 3, with loadings of 2% metal particles or more. Film formed by polymerization of monomers having unaligned suspensions are poorly conductive, with resistance in excess of 1 MΩ. With acoustic alignment, the anisotropic ratio ($R_X/R_Y$) of resistance exceeded 10$^6$-fold for particle loadings of 2%, 5%, and 10%, demonstrating anisotropic conductivity.

TABLE 1

Surface resistance in Ω for measurements in the X and Y-directions of the films, as shown in FIG. 3 for the particle alignments in the Y-direction, for 1%, 2%, 5%, and 10% silver coated nickel particle loadings with no acoustic stimulation, 150 kHz, and 2 MHz acoustic alignment.

| Loading Percentage | No Acoustics | | 150 kHz | | 2 MHz | |
|---|---|---|---|---|---|---|
| | $R_X$ | $R_Y$ | $R_X$ | $R_Y$ | $R_X$ | $R_Y$ |
| 10% | 1.2 | 1.2 | >10$^6$ | 0.8 | >10$^6$ | 1.0 |
| 5% | >10$^6$ | >10$^6$ | >10$^6$ | 2.1 | >10$^6$ | 6.9 |
| 2% | >10$^6$ | >10$^6$ | >10$^6$ | 3.8 | >10$^6$ | 10.1 |
| 1% | >10$^6$ | >10$^6$ | >10$^6$ | 6.0 | >10$^6$ | >10$^6$ |

Evaluation of Optical Properties of Films

Optical transparency tests were performed using a Gamry Spectro-115E spectrophotometer with deuterium/tungsten light source over the visible wavelength range of 400-800 nm. Film transparency was calculated by averaging the transmittance percentages over the wavelength range aforementioned. The 100% transmittance reference was set for an empty cell with only air inside, and the 0% transmittance reference was set with the light source shutter switched off.

The optical transparency in the visible light range for a 1-mm thick cured polymer film with 0% particle loading averaged to about 86%. The transparency of the same film with 10% particle loading was initially less than 5%, but increased to 22% after acoustic focusing at 2 MHz for 10 seconds followed by UV curing for 2 minutes, as shown in FIG. 5. When the particles were stimulated at 150 kHz, transparency increased to 63% while the film's resistance remained largely unchanged. The difference in transparency between the 2 MHz and 150 kHz focused films is attributed to particles focusing throughout the thickness, Z-direction, resulting in thinner lines of particles which block less light, yet maintain continuous electron conduction pathways. With the piezoelectric device used, wave amplitudes were greater at 150 kHz than at 2 MHz causing greater acoustic forces that dominated over gravitational forces in the generation of the particle lines, as suggested in FIG. 1. Transparencies for lower particle loadings are high, as exemplified for films with 2% silver coated nickel particles which exceed 80% transparency following acoustically alignment at 150 kHz, yet display a resistivity of only 3.8Ω.

Examples and embodiments described herein are for illustrative purposes only and various modifications or changes in light thereof will be suggested to persons skilled in the art and are included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein are incorporated by reference in their entirety, including all Figs. and tables, to the extent they are not inconsistent with the explicit teachings of this specification.

What is claimed is:

1. An anisotropic composite film, comprising a plurality of parallel lines fixed within a polymeric matrix, the parallel lines consisting of a multiplicity of metal or graphite particles, and wherein the metal or graphite particles within each of the parallel lines are continuously contacting, the parallel lines being equally spaced; wherein the film displays a resistance of 10 ohms or less across an axis aligned with the parallel lines and may be conductive or non-conductive across the thickness of the film, wherein the parallel lines are not perfectly straight, and wherein the metal or graphite particles within each of the parallel lines are not uniformly dense.

2. The anisotropic composite film according to claim 1, wherein the multiplicity of particles is electrically conductive.

3. The anisotropic composite film according to claim 1, wherein the polymeric matrix is a network of a chain-growth polymer.

4. The anisotropic composite film according to claim 1, wherein the polymeric matrix is transparent and wherein the anisotropic composite film is at least 50% transmissive.

5. The anisotropic composite film according to claim 1, wherein the particles comprising a metal are silver, copper, aluminum, iron, nickel, gold, platinum, palladium, molybdenum, titanium, tin, zinc, tungsten, lithium, germanium, titanium dioxide, zinc oxide, zirconia, gallium arsenide, indium phosphide, gallium nitride, cadmium telluride, $Cu(In,Ga)Se_2$, zinc sulfide, ruthenium 2-2'-bipyridine, lithium cobalt oxide, lithium iron phosphate, or lithium nickel manganese oxide.

6. The anisotropic composite film according to claim 1, wherein the particles are spheres, quasi-spheres, fibers, rods, wires, or platelets.

7. The anisotropic composite film according to claim 1, wherein the particles are core-shell particles comprising a metal shell.

8. The anisotropic composite film according to claim 1, wherein the particles have a cross-section of 10 nm to 100 µm.

9. The anisotropic composite film according to claim 1, wherein the chain-growth polymer comprises an acrylate, a methacrylate, a conjugated diene or a vinyl group.

10. The anisotropic composite film according to claim 1, wherein the polymeric matrix is transparent and wherein the anisotropic composite film is at least 80% transmissive.

11. A method of preparing an anisotropic composite film according to claim 1, comprising suspending a multiplicity of particles in a medium comprising a monomer and applying acoustic waves to the medium immediately before or during polymerizing of the monomer.

12. The method of claim 11, wherein the acoustic waves are standing waves.

13. The method of claim 11, wherein the polymerizing is initiated by irradiation with electromagnetic radiation.

14. The method of claim 13, wherein polymerizing comprises vinyl addition upon irradiation of a photoinitiator.

15. The method according to claim 11, wherein the particles comprise silver, copper, aluminum, iron, nickel, gold, platinum, palladium, molybdenum, titanium, tin, zinc, tungsten, lithium, germanium, titanium dioxide, zinc oxide, zirconia, gallium arsenide, indium phosphide, gallium nitride, cadmium telluride, $Cu(In,Ga)Se_2$, zinc sulfide, ruthenium 2-2'-bipyridine, lithium cobalt oxide, lithium iron phosphate, lithium nickel manganese oxide, or graphite.

16. An electronic device, comprising an anisotropic composite film according to claim 1, wherein the electronic device is a display or a solar cell.

17. The electronic device according to claim 16, wherein the device is flexible.

* * * * *